JOSEPH PINKHAM.
Improvement in Plow Coulters.
No. 123,838. Patented Feb. 20, 1872.
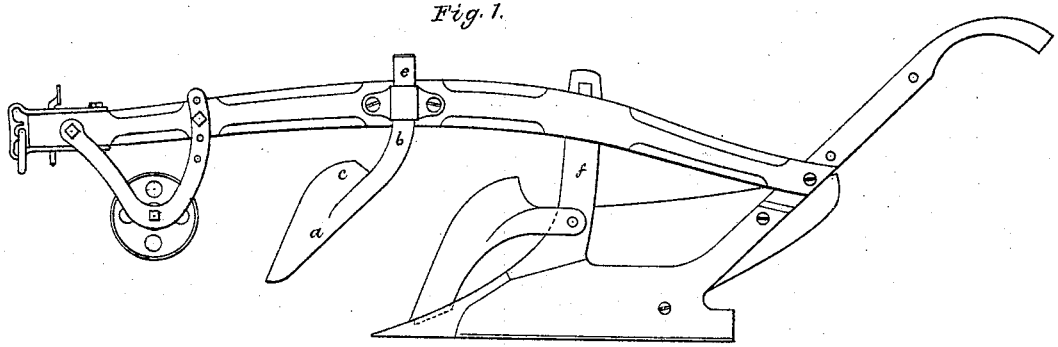
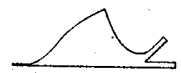
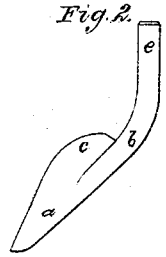
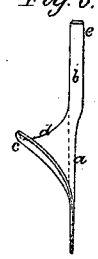
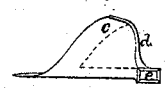
Witnesses
S. N. Piper
J. R. Snow
Joseph Pinkham.
by his attorney
R. H. Eddy

UNITED STATES PATENT OFFICE.

JOSEPH PINKHAM, OF NEW MARKET, NEW HAMPSHIRE.

IMPROVEMENT IN PLOW-COLTERS.

Specification forming part of Letters Patent No. 123,838, dated February 20, 1872.

*To all persons to whom these presents may come:*

Be it known that I, JOSEPH PINKHAM, of New Market, in the county of Rockingham and State of New Hampshire, have invented a new and useful Improvement in Colters for Plows; and do hereby declare the same to be fully described in the following specification and represented in the accompanying drawing, of which—

Figure 1 denotes a front elevation of a plow with my said colter applied to it. Fig. 2 is a side view, Fig. 3 a front view, and Fig. 4 a top view of the colter.

The invention has reference to what is known as a "wing-colter," that is, a colter having a deflecting wing projecting aside from it at an angle. Such colters, as heretofore made, have an angular opening or space between the wing and the support-bar or shank of the colter, such space while the colter may be in use being liable to intercept and become choked with stubble, weeds, vines, roots, or other matters. In order to avoid this difficulty incident to the wing-colter, I construct such colter with no open space between the wing and the shank; but interpose between such, and unite them by a septum or web, curved so as to readily direct off the vines or weeds, &c., which may rise upon it, and cause them to be deflected off or upon the wing, in order that they may be easily discharged thereby.

In Figs. 2, 3, and 4, the main part of the colter is shown at *a*, its shank at *b*, its wing at *c*, and the uniting-web at *d*. In such figures the colter is shown as provided with a prismatic head, *e*, to its shank, such being to aid in fastening it to the plow-beam, as shown in Fig. 1. I sometimes, however, make the colter with other means of attaching it to the plow— as, for instance, it may have a furcated head to adapt it to be fastened to the plow-standard *f*, see Fig. 1, in which such a colter is shown as fastened to the standard, Fig. 5 exhibiting a top view of it. Under these latter circumstances the toe of the colter would be stepped into the nose of the plow.

With my improved colter there is little or no chance of it being clogged by corn-stubs, weeds, vines, grass, straw, clover, roots, or other similar matters, its form causing such to pass freely off the wing or off the colter. It will be evident that a colter on the improved plan may be made with its wing and web projecting from either the right or left side of its shank.

I make no claim to a colter having a deflecting-wing alone.

I am aware of the colter shown in the United States Patent No. 48,849, and make no claim thereto, as such colter has its deflecting-wing or blade for some distance downward from its top, disconnected from its shank, there being an angular space between the two which is especially avoided by my construction, and is liable to become choked with roots, grass, or stubble.

I am also aware of the "jointer-share and mold-board," shown in the United States patent No. 110,924, and constituting the subject thereof. I make no claim to such, as they differ materially from my invention, they being in two separate parts connected by screw-bolts; and, furthermore, they are designed to act very differently from my colter, which simply acts like the common wing-colter, except in not being liable, like it, to clog, as described. The patented jointer-share and mold-board cuts and turns a small furrow-slice, and holds the separated herbage and stubble from falling in or mixing with that on the main furrow-slice. The wing of my colter is designed to prevent the shank from being clogged by the stubble, the connection-web being to prevent the roots or stubble from being caught between the wing and the shank.

I therefore claim—

My improved colter, constructed with the deflecting web and wing formed and arranged with the shank, as set forth and represented.

JOSEPH PINKHAM.

Witnesses:
 R. H. EDDY,
 S. N. PIPER.